United States Patent [19]

White

[11] Patent Number: 5,406,675
[45] Date of Patent: Apr. 18, 1995

[54] FLUTTER FREE DUAL WHEEL CASTER ASSEMBLY

[75] Inventor: Craig A. White, Shaker Heights, Ohio

[73] Assignee: Century Products Company, Macedonia, Ohio

[21] Appl. No.: 81,595

[22] Filed: Jun. 23, 1993

[51] Int. Cl.6 ............................................. A47B 91/00
[52] U.S. Cl. ......................................... 16/47; 16/35 D
[58] Field of Search ............................ 16/47, 48, 35 D

[56] References Cited

U.S. PATENT DOCUMENTS 2,602,612  7/1952  Zimmerman et al. .............. 16/35 D
3,795,408  3/1974  Nemessanyi .

FOREIGN PATENT DOCUMENTS 2089654  6/1982  United Kingdom ................... 16/47

Primary Examiner—W. Donald Bray
Attorney, Agent, or Firm—Graham & James

[57] ABSTRACT

An improved dual wheel caster assembly is provided having a limited slip frictional clutch to create rotational coupling between the two wheels, but with sufficient slippage to allow adequate directional maneuverability. The caster has improved resistance to flutter due to the rotational coupling between the wheels.

7 Claims, 2 Drawing Sheets

FLUTTER FREE DUAL WHEEL CASTER ASSEMBLY

BACKGROUND OF THE INVENTION

The invention relates to dual wheel caster assemblies, and more particularly to a caster assembly with improved stability for swivel mounted support wheels on movable vehicles such as infant strollers, baby carriages, carts, or wheelchairs.

Prior art single and dual wheel caster assemblies have distinct problems. A single wheel swivel-mounted to a rigid frame tends to flutter and tracks poorly when exposed to lateral forces. While dual wheel casters assemblies tend to track better, they are still subject to annoying flutter. The flutter in these casters doesn't affect the directional stability of the load, but rather creates an annoying vibration and adds drag to the forward motion of the system.

The flutter occurs because the force correcting the direction of the caster is roughly proportional to the sine of the angle between the direction of travel of the system and the direction the caster is pointing. Since the sine of zero is zero, there is very little restoring force for small angular deviations and small perturbations lead to oscillations of the caster about the direction of travel. The light weight of the caster system in comparison to the load means its natural frequency of oscillation is high compared to normal directional pertubations of the load, leading to a flutter of the wheels rather than deviation of cart direction.

U.S. Pat. No. 3,795,408 teaches use of a frictional clutch system for the purpose of damping "fishtailing" oscillations in trailer systems, such as a truck towing one or more trailers. In that case trailers being towed out of a curve are apparently over steered or under steered leading to a side to side oscillation of increasing amplitude, particularly under acceleration. In this system the oscillation is driven by motions of the load (trailer) in a whip like fashion, driven by over and under steering corrections created by the trailer geometry. In this system the energy of the oscillation is contained in the motions of the load rather than the deviation of the wheels. Frictionally restricting relative rotation between the wheels being pivoted to steer the trailer acts to dampen this motion by removing the energy of the oscillation and thus prevents fishtailing.

In dual wheel caster assemblies the wheels are generally free to rotate independent of one another. While this rotational freedom is necessary for adequate directional maneuverability, it turns out that flutter in the dual wheel systems can be prevented by binding the wheels to each other in some fashion so that they are constrained to rotate as a unit. It is therefore desireable to have a system that allows adequate rotational freedom for directional maneuverability while still providing enough rotational coupling to prevent flutter.

A prior commercial solution to this problem has been to add interference ribs in the hubs of each wheel to create frictional coupling between the wheels and the axle. Such ribs run axially, and project radially into the ID of the wheel. Their purpose is to provide an interference fit, which ties together the motion of the wheels in a dual wheel caster system. The system has several drawbacks. The first drawback is the tolerances. Close tolerances in the plastic(s) used in wheel fabrication are difficult to hold. This can cause the wheel to be too loose or too tight on the axle causing flutter or making it hard to steer (respectively). The ribs help to reduce this to some degree, but the problem still exists. Since this system of wheel attachment is used in both wheels in each caster system, the tolerances must be held in both wheels to provide the proper resisting torque to eliminate wheel flutter while not being too great as to hamper maneuverability.

Another problem with such prior art devices is that the ribs can wear down with use. Thus, as the ribs wear down, wheel flutter will tend to return.

SUMMARY OF THE INVENTION

The present invention is directed to a dual wheel caster assembly that incorporates a frictional clutch to provide controlled rotational coupling between the wheels to prevent flutter. The invention employs a controlled force that is constantly applied to couple the dual wheels to a controlled degree. Since it uses a spring, it will continue to apply the force to provide the controlled torque.

The frictional clutch provides several advantages over the prior art. First, the frictional clutch allows enough rotational slippage between the two wheels to provide adequate directional maneuverability, while still providing enough coupling to prevent flutter.

A second advantage over the prior art is the simplicity and reliability of the clutch system. The invention uses relatively few parts. The design of the invention lets it operate effectively and reliably with low precision parts or those worn by use.

DETAILED DESCRIPTION OF THE PREFERRED EMBODIMENT

Figure 1:
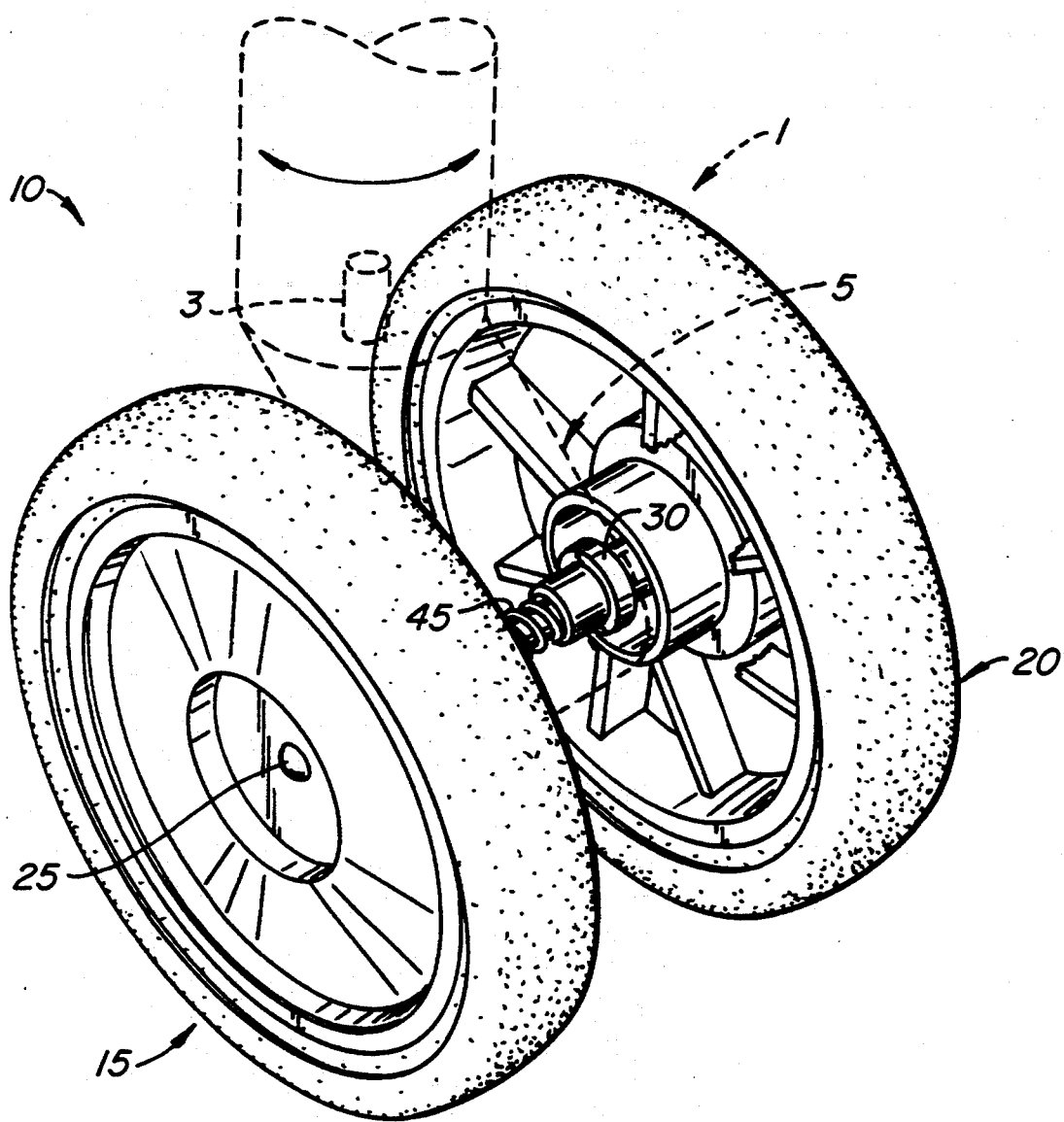
FIG. 1 is a perspective view of the preferred embodiment of the invention shown in the assembled condition.
Figure 2:
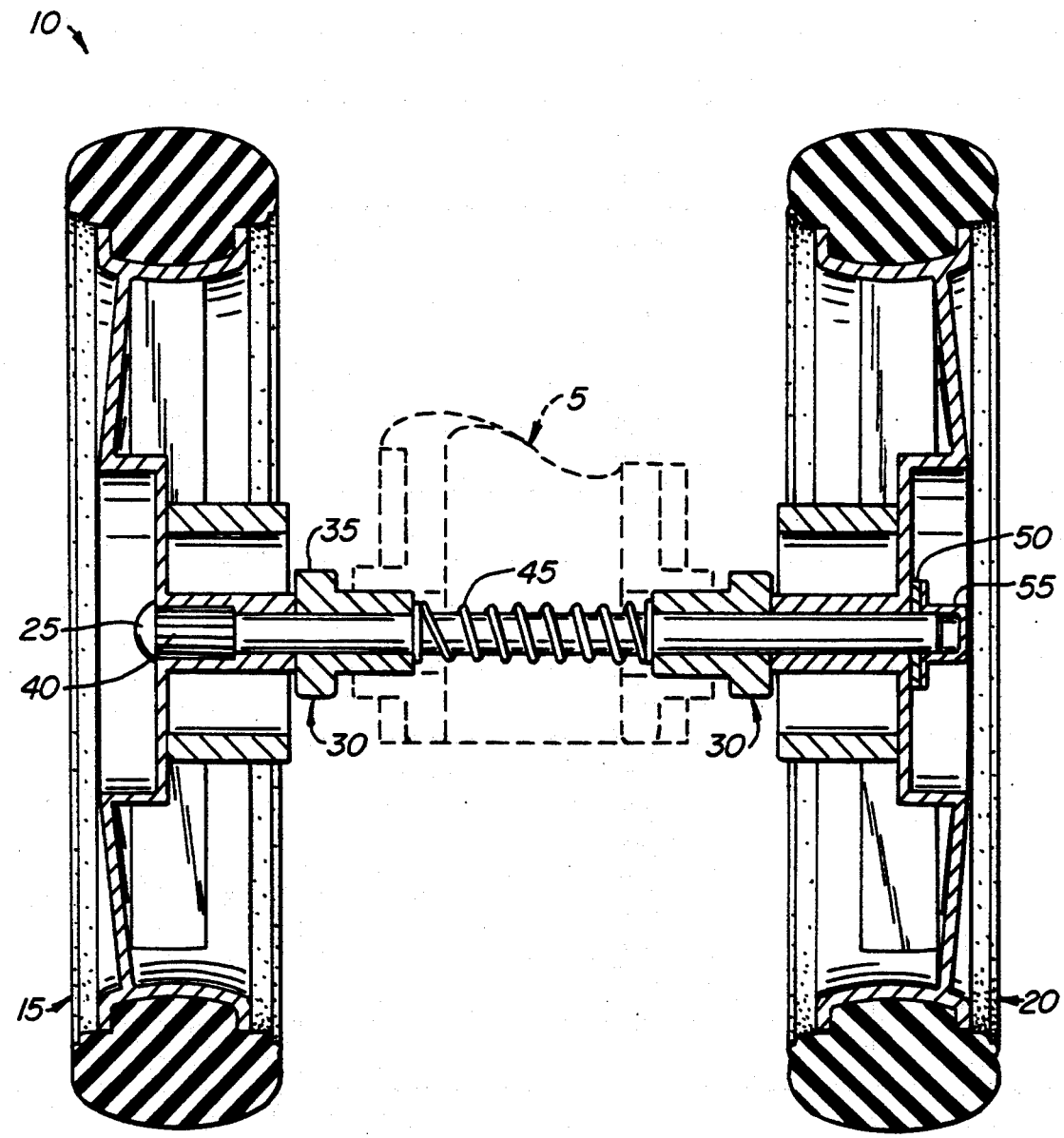
FIG. 2 is a front cross-sectional view of the preferred embodiment of the invention showing the arrangement of the wheels, axle, bushings, and spring.

Referring to FIG. 1 and FIG. 2, the caster assembly 1 includes an axle/wheel assembly 10 mounted in a swivel arm 5 which is in turn mounted to a pivot 3 to allow rotation of the caster assembly 1. As can be seen from FIG. 1, axle 25 of the axle/wheel assembly 10 is offset from the axis of pivot 3 so that it is not in-line with the pivot axis. Also it can be seen that apertures in the swivel arm 5 receive two bushings 30. The axle/wheel assembly 10 is comprised of: a fixed wheel 15 press fit onto a straight knurl 40 at one end of the axle 25 so as to rotate with the axle 25; a free wheel 20 mounted to the axle 25 at the end opposite the fixed wheel 15 and free to rotate with respect to the axle 25; two bushings 30, generally cylindrical in shape, surrounding the axle 25, adjacent to the inside edges of the fixed wheel 15 and the free wheel 20; a spring 45 mounted axially over the axle between the two bushings 30; a washer 50 mounted over the axle 25 riding against the outside edge of the free wheel 20; and an end cap 55 pressed onto the end of the axle 25 next to the washer 50.

The bushings 30 have flanges 35 extending radially outward from the ends adjacent to the fixed wheel 15 and the free wheel 20. The bushings 30 are mounted in the swivel arm 5 so as to be able to slide axially on the axle 25 and within the mount in the swivel arm 5 to the extent allowed by the flanges 35. The axle 25 is free to rotate inside the bushing 30.

The spring 45 applies outward axial pressure to the bushings 30 causing the free wheel 20 to be pressed against the washer 50, which in turn is pressed against the end cap 55 which being fixed to the end of the axle 25, must rotate with it. The resulting friction between the washer 50, the end cap 55, and the outside edge of the free wheel 20 tends to cause the free wheel 20 to rotate in synchronization with the axle 25 and thus with the fixed wheel 15. The resiliency of the sides of swivel arm 5 may also serve to spread the bushings 30 to cause washer 50 to frictionally engage end cap 55.

When the torque between the free wheel 20 and the fixed wheel 15 exceeds the frictional force coupling them, the free wheel 20 rotates independent of the fixed wheel 15. This relative rotation allows the caster to pivot to provide the needed directional maneuverability.

I claim:

1. A dual wheel caster assembly, comprising:
   means for pivoting the caster assembly about a pivot vertical axis;
   a swivel arm, the swivel arm having a free end extending away from the pivot axis, and connected to the pivoting means at another end, the swivel arm extending away from the pivot axis with means at the free end for supporting an axle;
   an axle mounted to the swivel arm, with the axis of said axle substantially perpendicular to both the pivot axis and the line of displacement from the pivot axis to the mount of the axle in the swivel arm;
   a first wheel attached to one end of the axle;
   a second wheel rotatably attached to the axle at the end of the axle opposite the first wheel;
   a clutch means for coupling the rotation of the second wheel to the rotation of the first wheel allowing for frictional rotational slippage between the second wheel and the first wheel, wherein the first wheel is rotationally bound to said axle, and said second wheel is rotatably attached to the axle.

2. The caster assembly of claim 1, wherein the clutch means is comprised of:
   a first bushing, generally cylindrical in shape, rotatably mounted over the axle adjacent to the inside edge of the first wheel, and mounted in one side of the swivel arm;
   a second bushing, generally cylindrical in shape, rotatably mounted over the axle, adjacent to the inside edge of the second wheel, and mounted in the side of the swivel arm opposite the first bushing;
   a spreading means to resiliently apply axial pressure tending to separate the two bushings;
   a radial flange mounted and rotationally bound to the axle at the outside edge of the second wheel so as to absorb the axial force on the second wheel created by the spreading means and bushings and transfer it into frictional coupling by rubbing against the outside edge of the second wheel.

3. The caster assembly of claim 2 wherein the spreading means is a spring mounted over the axle between the first and second bushings.

4. The caster assembly of claim 2 wherein the spreading means is the composed of the compressed resilient sides of the arm.

5. A dual wheel caster assembly, comprising:
   a pivot, having an axis extending along its length, and a swivel arm connected to said pivot at one end of said arm;
   an axle mounted to said swivel arm at another end of said arm, said axle having an axis substantially perpendicular to and offset from said pivot axis;
   a first wheel attached to one end of said axle;
   a second wheel rotatably attached to said axle at the end of said axle opposite the first wheel;
   a clutch for coupling the rotation of said second wheel to said first wheel, said clutch comprising a portion fixed to said axle attached to said second wheel, and a bushing, rotatably mounted over said axle and adjacent to said second wheel, and means to resiliently apply axial pressure on said bushing to force said second wheel into frictional engagement with said portion fixed to said axle.

6. The dual wheel caster assembly of claim 5, further comprising:
   a second bushing, rotatably mounted over said axle and adjacent said first wheel, wherein
   said resilient means is a spring lying between said bushings and tending to separate said two bushings.

7. The dual wheel caster assembly of claim 6, wherein:
   said swivel arm has apertures receiving said two bushings and said axle passes thorough said swivel arm apertures, and wherein said clutch portion fixed to said axle is a fixed end cap, and further comprising a washer disposed between said second wheel and said end cap.

* * * * *